United States Patent [19]

Mizutani et al.

[11] Patent Number: 5,572,537
[45] Date of Patent: Nov. 5, 1996

[54] MODULATOR-DEMODULATOR DEVICE CAPABLE OF DETECTING AN UNSYNCHRONIZED FRAME STATE BASED ON HARD AND SOFT ERROR VALUES

[75] Inventors: Yasunao Mizutani, Fuchu; Takashi Kaku, Tama, both of Japan

[73] Assignee: Fujitsu Limited, Kawasaki, Japan

[21] Appl. No.: 53,804

[22] Filed: Apr. 29, 1993

Related U.S. Application Data

[62] Division of Ser. No. 635,520, Feb. 13, 1991, Pat. No. 5,319,650, filed as PCT/JP90/00769, Jun. 13, 1990.

[30] Foreign Application Priority Data

Jun. 13, 1989 [JP] Japan ................................. 1-151272
Jun. 27, 1989 [JP] Japan ................................. 1-164624

[51] Int. Cl.$^6$ ................................................. H03M 13/12
[52] U.S. Cl. ............................................................. 371/46
[58] Field of Search ........................................ 371/46, 43

[56] References Cited

U.S. PATENT DOCUMENTS

| | | | |
|---|---|---|---|
| 4,146,841 | 3/1979 | McRae | 375/330 |
| 4,546,322 | 10/1985 | Crutcher | 329/308 |
| 4,967,413 | 10/1990 | Otani | 371/374 |

FOREIGN PATENT DOCUMENTS

| | | |
|---|---|---|
| 61-118049 | 6/1986 | Japan . |
| 61-137447 | 6/1986 | Japan . |
| 63-10837 | 6/1986 | Japan . |

OTHER PUBLICATIONS

Rauchwerk, M., "A Technique for Multidimensional Symbol and Multiplexing Frame Synchronization in Multidimensional Trellis Coded Modems . . . ", *IEEE* CH2538, Jul. 1988, pp. 80–84.

Patent Abstracts of Japan, vol. 10, No. 61 (E-387) (2118) Mar. 11, 1986 & JP-A-60 213 150 (Nippon Denki K. K.) Oct. 25, 1985.

CCITT Blue Book, vol. VIII, Assembly VIII.1, *Data Communication over the Telephone Network*, Recommendations of the V Series; Geneva 1989, pp. 234–251 Recommendations. V.32.

CCITT Red Book, vol. VIII, Assembly VIII.1, *Data Communication over the Telephone Network*, Recommendations of the V Series; Geneva 1989, pp. 203–215 Recommendations. V.29.

*Primary Examiner*—Stephen M. Baker
*Attorney, Agent, or Firm*—Staas & Halsey

[57] ABSTRACT

A modulator-demodulator device includes a transmitter side having an error control coding circuit for adding redundancy to a bit sequence to be transmitted from a bit processing circuit and coding the bit sequence. A data sequence to coordinate transforming circuit transforms the bit sequence from the error control circuit into a signal point coordinate on a complex plane. A coordinate rotating circuit rotates the transformed signal point coordinates based on frame phase information from a frame phase generating circuit. In the receiver side, a coordinate rotating circuit applies rotation in a direction reverse that of the transmitter coordinate rotating circuit based on the frame phase information from the frame phase generating circuit. A second decision circuit decides the maximum likelihood signal point by utilizing the redundancy added by the error control coding circuit of the transmitter side and correcting the coordinate error of the received signal point. An unsynchronized frame state deciding circuit decides the unsynchronized frame state based on the distance between the decision point determined by the maximum likelihood signal point deciding circuit and the demodulated received signal point on the complex plane, so that the synchronized frame state is quickly detected. An evaluation value is designated for each of the transition sequence of signals, and in the receiver side, error control signal decoding is carried out so that the transition sequence of the maximum likelihood received signal is selected based on the updated evaluation value and the error in the demodulated signal is corrected, so that the error in the data transmission is corrected.

7 Claims, 5 Drawing Sheets

FIG. 1
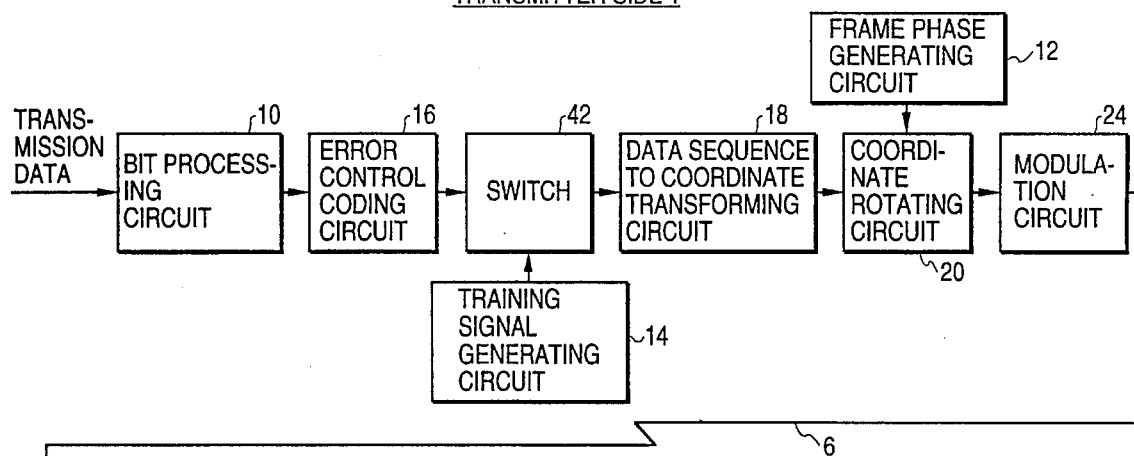
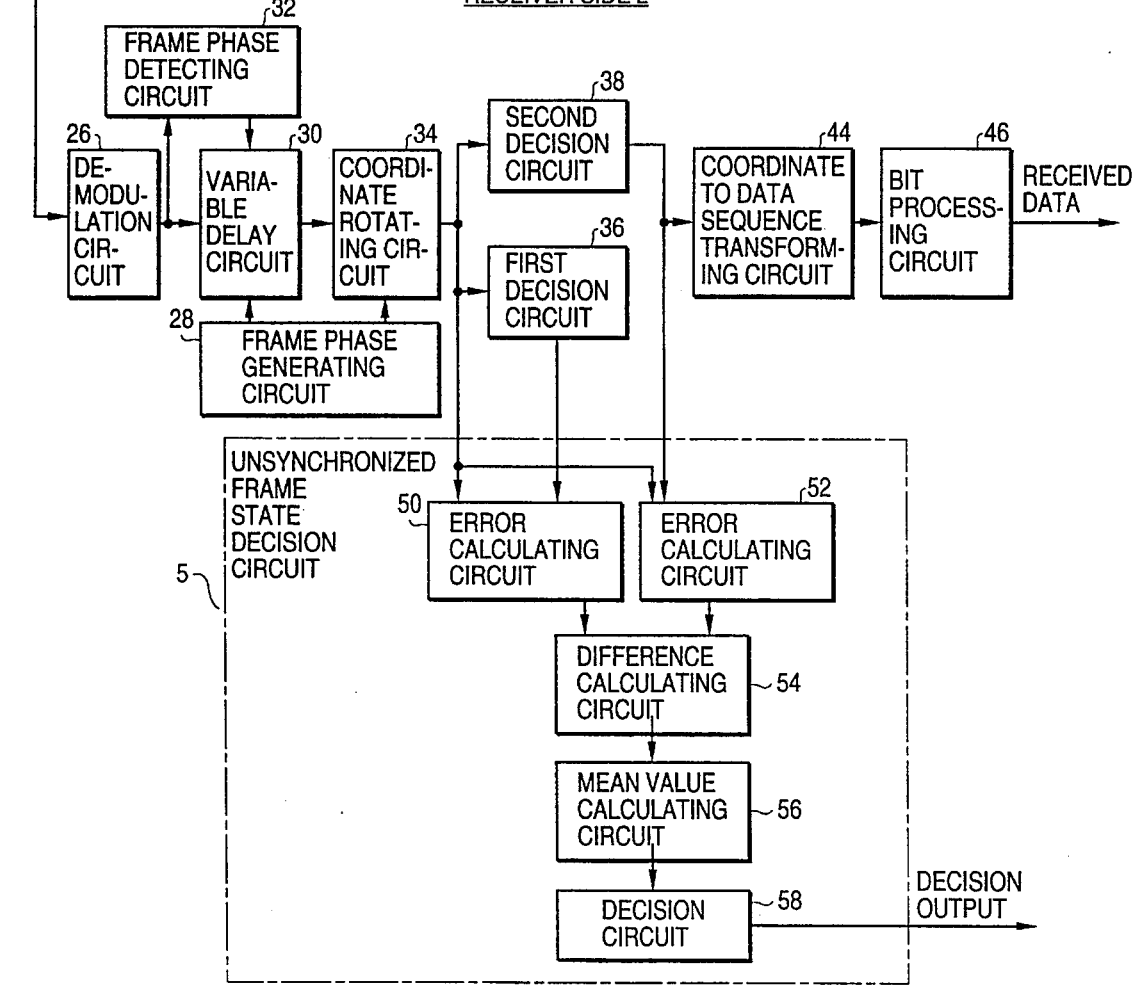

FIG. 3 ARRANGEMENT OF SIGNAL POINTS IN TRELLIS CODING MODULATION

FIG. 4
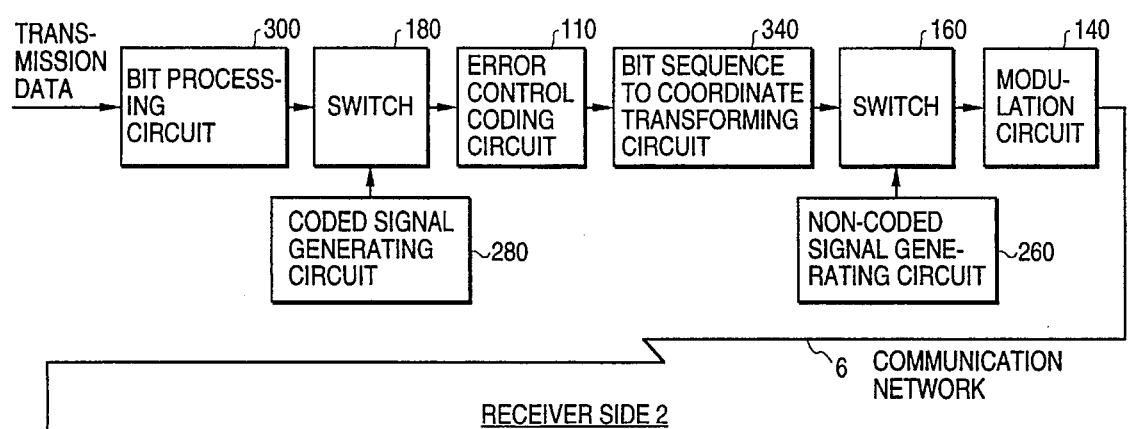
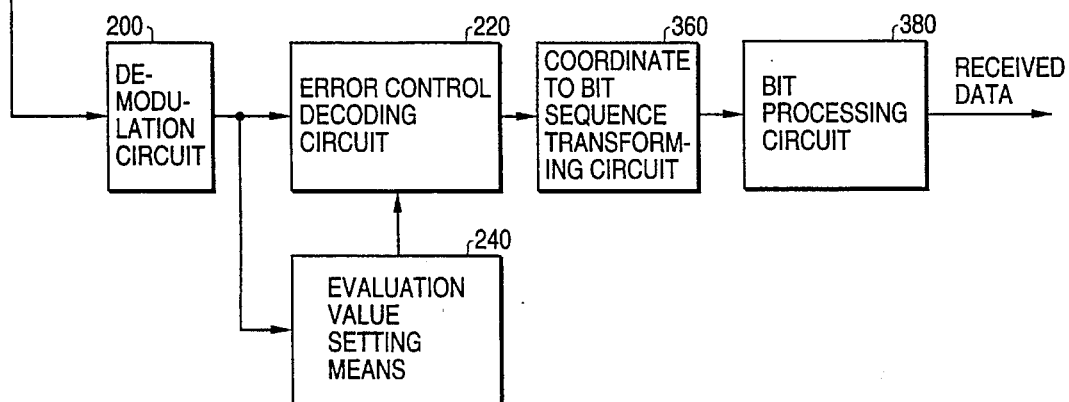

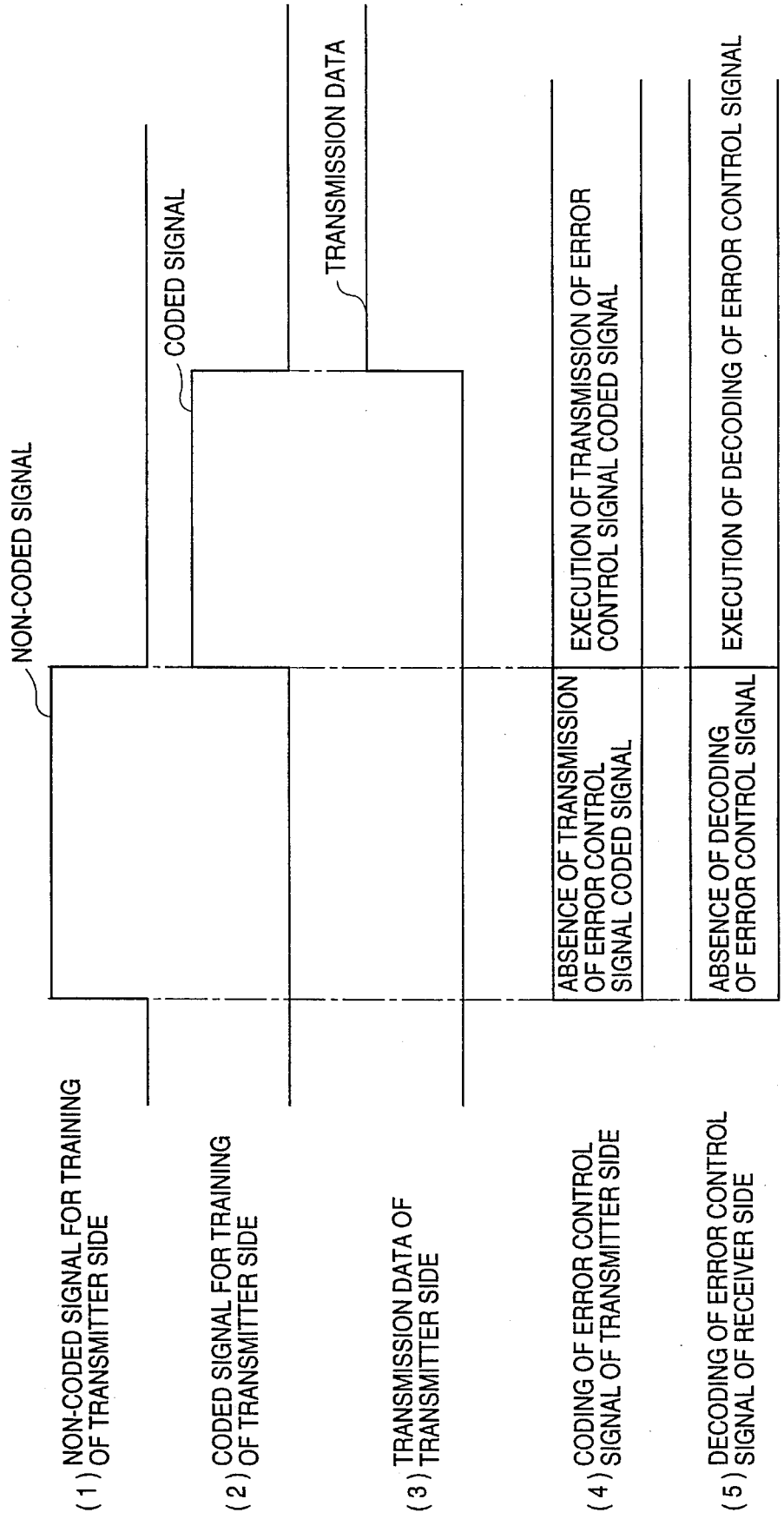

MODULATOR-DEMODULATOR DEVICE CAPABLE OF DETECTING AN UNSYNCHRONIZED FRAME STATE BASED ON HARD AND SOFT ERROR VALUES

CROSS-REFERENCED TO RELATED APPLICATION

This application is a divisional of U.S. application Ser. No. 07/635,520, filed Feb. 13, 1991, now U.S. Pat. No. 5,319,650, filed as PCT/JP90/00769, Jun. 13, 1990. This application is also related to U.S. application Ser. No. 08/053,803, filed Apr. 29, 1993.

BACKGROUND OF THE INVENTION

The present invention relates to a modulator-demodulator (modem) device for a phase modem system, a quadrature amplitude modem system, and the like. The present invention relates particularly to a device capable of detecting an unsynchronized frame state in synchronization transmission in a modem device. The device according to the present invention is used, for example, for a modem in terminal devices for data communication.

In a synchronization type data transmission system adopting a phase modem system, a quadrature amplitude modem system, and the like, frame synchronization between the transmitter side and the receiver side is established by introducing a frame synchronization signal in a training signal for the automatic pulling-in of the automatic equalizer of the receiver side prior to the transmission of the data. Data transmission is carried out with the synchronized frame phase which is established when receiving the training signal. If the frame phase deviates due to a variation in the characteristics of the data transmitting network, and an unsynchronized frame state occurs, normal data transmission is prevented. However, this unsynchronized frame state can be detected only by an abnormal condition of received data. Thus, it would be desirable if a system in which the frame synchronization is detected quickly and reliably could be realized.

In general, for a transmission device which uses an analog line having a transmission rate of 2400 bps to 19200 bps, data transmission speed is normally set to an integer number times 2400 bps. Thus, in a transmission device in which the modulation speed has an interval for synchronizing data and for transmitting and receiving synchronized data, which is different from 2400 bps, and the number of bits which can be transmitted at one time is an integer, it is necessary to carry out transmission processing in a frame synchronized condition between a transmitter and a receiver by using frame phase information in order to coincide with the transmission speed of an integer multiple of the standard 2400 bps.

In a prior art system, the frame phase synchronization between a transmitter side and a receiver side is established by introducing a frame synchronization signal in a training signal prior to data transmission in order to make the frame phase of the receiver side coincide with the frame phase of the transmitter side, and during the data transmission, the operation is carried out with synchronized frame phase when the training signal is received.

For example, if one frame is assumed to be constituted by 8 modulations, a modulation synchronization signal is derived by demodulating each instance of modulation, frame phase information is generated by counting the number of these demodulated synchronization signals, and the timing of clearing a counter is preliminarily determined by the frame phase synchronization signal when the training signal is received. Frame phase synchronization between the transmitter side and the receiver side can be established even if the frame synchronization signal is not received during data transmission.

However, in such a prior art frame synchronization system, if part of the modulation signal within one frame is lost due to a variation in the characteristics of the transmitter, such as distortion of the signal waveform caused by noise during the data transmission, a momentary loss of signal caused by a cut of the line, or the like, the frame phase on the receiver side deviates and an unsynchronized frame state occurs. Once the unsynchronized frame state occurs, frame synchronization cannot be recovered, normal data transmission is prevented, and this unsynchronized frame state can only be detected by the abnormal state of the received data, which causes a problem in operation.

SUMMARY OF THE INVENTION

It is the main object of the present invention to provide a device for causing a rotation, based on frame phase information, of the signal point coordinates on a complex plane that correspond to a bit sequence from an error control coding means in a transmitter side, causing, in a receiver side, a rotation of the received signal point coordinates in the reverse direction with respect to that of the above mentioned coordinate rotation based on the frame phase information, deciding the maximum likelihood signal point by utilizing the redundancy added by an error control coding means at the transmitter side, deciding an unsynchronized frame state based on the distance between the decided maximum likelihood signal point and a demodulated received signal point, and thus, quickly detecting the unsynchronized frame state and enhancing the reliability of modem operation.

In accordance with the present invention, there is provided a modulator-demodulator device capable of detecting an unsynchronized frame state, characterized in that the device comprises in the transmitter side: bit processing means for delivering at predetermined intervals a bit sequence of data to be transmitted; frame phase generating means for generating frame phase information indicating that an interval of integer N times the interval of the bit sequence constitutes one frame; error control coding means for adding redundancy according to a predetermined procedure to a bit sequence to be transmitted from the bit processing means and coding the bit sequence; data sequence to coordinate transforming means for transforming the bit sequence from the error control coding means into coordinates of a signal point on a complex plane; coordinate rotating means for rotating the coordinates of a signal point based on the frame phase information from the frame phase generating means; and modulation means for phase-modulating or quadrature-modulating the output of the coordinate rotating means and delivering the modulated output to a communication network. The device comprises in the receiver side: demodulation means for demodulating the signal received from the network to determine the coordinates of the received signal point on the complex plane; frame phase detecting means for detecting a frame synchronization signal from a training signal transmitted from the transmitter side and causing a coincidence between the frame phase from the frame phase generating means and the received frame phase; coordinate rotating means for applying rotation in the reverse direction to that of the coordinate rotating means of the transmitter side; maximum likelihood signal point deciding means for deciding the maximum likelihood signal point by utilizing the redundancy added by the error control coding means of the transmitter side and correcting coordinate errors of the received signal point; and unsynchronized frame state deciding means for deciding the unsynchronized frame state based on the distance between the decision point, i.e., the signal point decided by the maximum likelihood signal point deciding means and the demodulated received signal point on the complex plane.

Also, in accordance with the present invention there is provided a modulatordemodulator device capable of detecting an unsynchronized frame state, characterized in that a receiver device, connected to a network in which data to be transmitted is maximum likelihood coded, the coded data is phase modulated, and the phase modulated coded data is transmitted. The device comprises: demodulator means for demodulating the phase modulated data; compensating means for compensating for signal deterioration in the rotation of the demodulated base band signal; proximate signal point deciding means for deciding one signal point in the proximity of the compensated signal from a plurality of ideal signal points to be transmitted with respect to the compensated signal delivered from the compensating means; maximum likelihood signal point deciding means for decoding the maximum likelihood coded data, deciding the maximum likelihood coded data by using a compensation signal delivered from the compensating means, and delivering the result of the decision; means for comparing the compensated signal and a hard decision signal point delivered by the proximate signal point deciding means and deriving a first error; means for comparing the compensated signal and the maximum likelihood signal point delivered by the maximum likelihood signal point deciding means and deriving a second error; and means for deriving the difference between the first error and the second error; the unsynchronized frame state being detected based on the derived difference.

Further, in accordance with the present invention, there is provided a modulatordemodulator device capable of detecting an unsynchronized frame state, characterized in that the device comprises in a transmitter side: error control coding means for coding a signal to be transmitted in accordance with a predetermined transition rule governing a transition between signal points on the complex plane; modulation means for modulating the signal coded by the error control coding means, for transmission in a communication network; first transmission signal selecting means for selecting for output, during a predetermined time period, a non-coded signal, i.e., a signal that is not to be coded by the error control coding means; second transmission signal selecting means for selecting, for output, during a predetermined time period upon completion of the output of the non-coded signal, a predetermined coded signal that is to be coded by the error control coding means and for selecting transmission data for output upon the completion of the output of the coded signal; and the device comprises in a receiver side: demodulation means for demodulating the signal received from the communication network to determine the signal point on the complex plane; error control signal decoding means for setting an evaluation value for each transition in a sequence of transitions in the received signal based on the transition rule of the error control coding means, updating the evaluation value for each receipt of the signals, and selecting the maximum likelihood transition sequence of the received signal based on the updated evaluation value to correct an error in the demodulated signal point coordinates determined by the demodulator; and evaluation value setting means for setting to said error control signal decoding means the initial value of the evaluation value updated by the coding signal which is first received upon the switching from the transmission of the non-coded signal to the transmission of the coded signal.

BRIEF DESCRIPTION OF THE DRAWINGS

FIG. 1 shows a modulator-demodulator device according to an embodiment of the present invention;

FIG. 4 shows a modulator-demodulator device according to another embodiment of the present invention; and FIG. 5 shows waveforms of signals for explaining the operation of the device shown in FIG. 4.

DETAILED DESCRIPTION OF THE PREFERRED EMBODIMENTS

A modulator-demodulator (modem) device according to an embodiment of the present invention is shown in FIG. 1.

Figure 2:
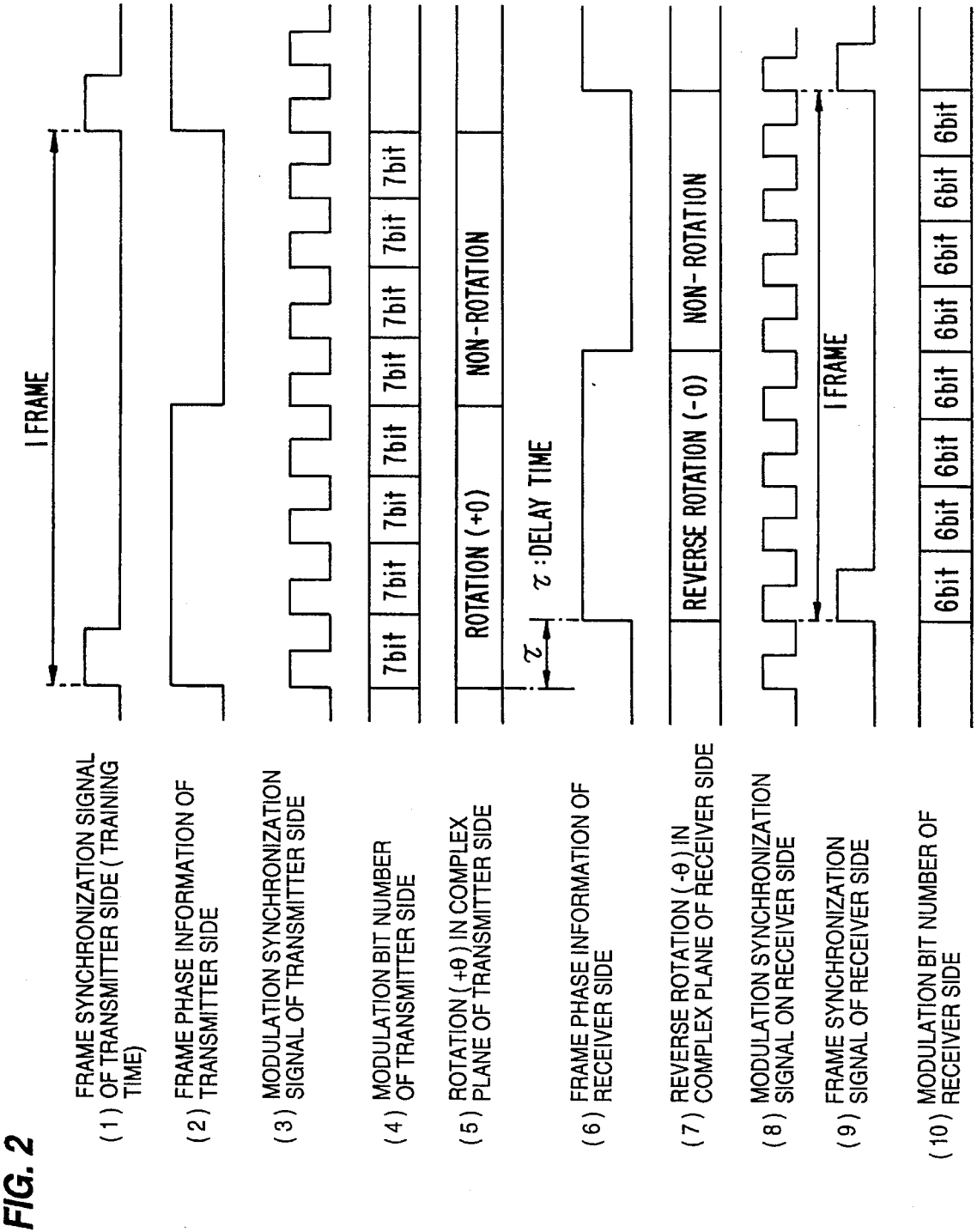
FIG. 2 shows waveforms of signals for explaining the operation of the device shown in FIG. 1.
Figure 3:
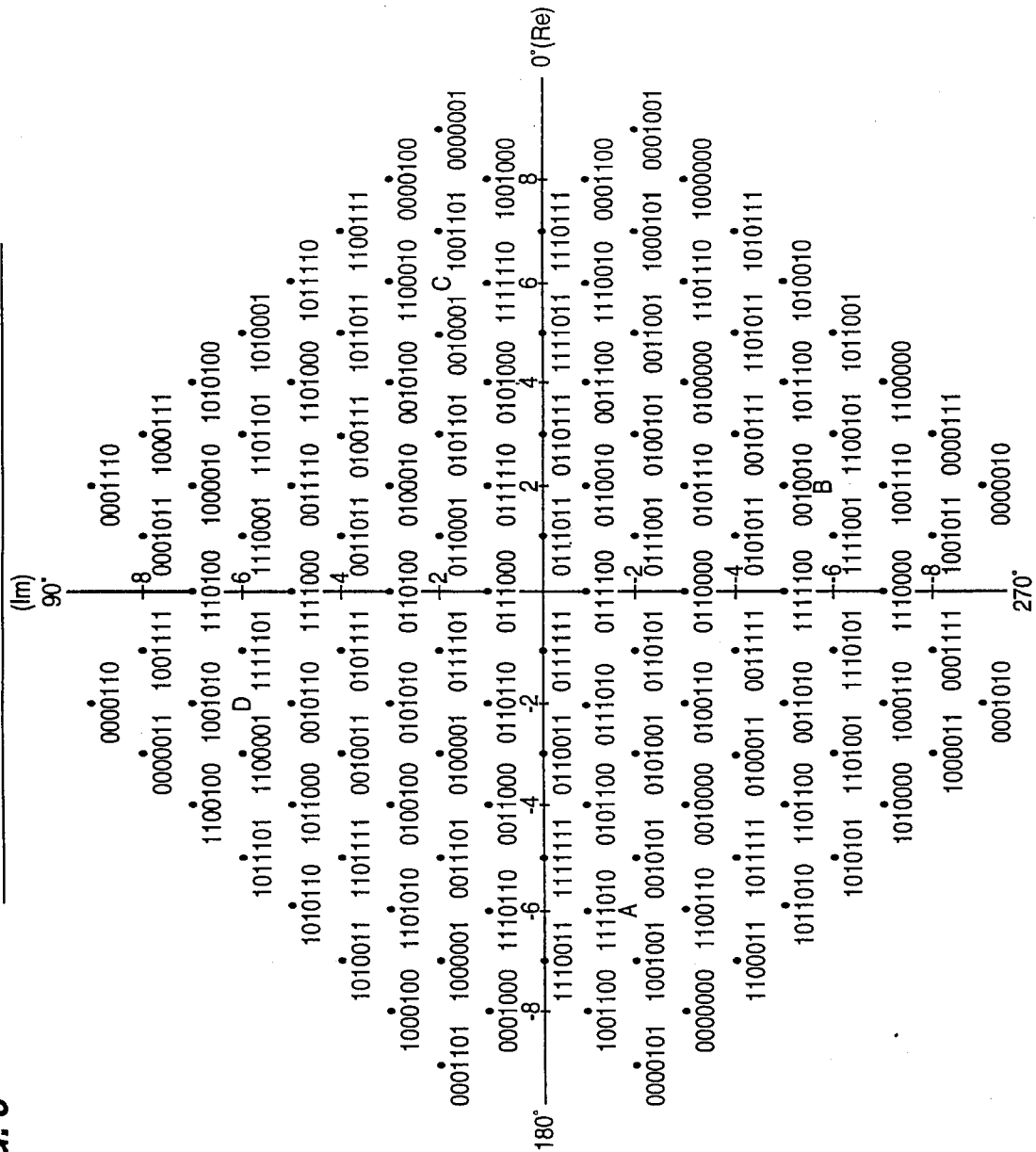
FIG. 3 shows an arrangement of signal points in Trellis coding modulation.

The operation of the modem shown in FIG. 1 is illustrated in FIG. 2 and FIG. 3.

In the modem of FIG. 1, in the transmitter side, the signal to be transmitted is rotated on a complex plane based on the frame phase, and in the receiver side, the received signal point is rotated on a complex plane in the reverse direction of that of the transmitter side to be returned to the original position. The unsynchronized frame state is then decided based on the difference between the distance of hard decision and the distance of soft decision. In a network where the unsynchronized state does not occur frequently, the hard decision signal point and the soft decision signal are usually the same point, and, in such a case, the unsynchronized state is determined and detected by the fact that the difference between the errors of these two points is zero, and that the difference between the errors of these two points will increase when an unsynchronized state occurs. Therefore, the difference between the hard decision value and the receiving signal, i.e., the first error, and the difference between the soft decision value and the receiving signal, i.e., the second error are calculated, the difference between the first error and the second error is obtained by, for example, subtraction,the obtained value is subject to an integration operation, or the like to determine a mean value, and then the unsynchronized frame state can be decided when the mean value is more than a predetermined value.

In the device of FIG. 1, the transmitter side 1 includes a bit processing circuit 10 for delivering the bit sequence of the transmission data at predetermined intervals, a frame phase generating circuit 12 for generating frame phase information in which an interval which is an integer multiple of the interval of the bit sequence constitutes one frame, a training signal generating circuit 14 for generating a training signal including a frame synchronization signal prior to the data transmission, a Trellis coding circuit 16 as the error control coding circuit for adding redundancy according to a predetermined procedure to the bit sequence to be transmitted from the bit processing circuit 10 and coding the bit sequence, a data sequence to coordinate transforming circuit 18 for transforming the bit sequence from the error control coding circuit 16 into the coordinates of a signal point on the complex plane, a coordinate rotating circuit 20 for rotating the transformed coordinates of the signal point transformed by the data sequence to coordinate transforming circuit 18 based on the frame phase information from the frame phase generating circuit 12, and modulation means 24 for phase-modulating or quadrature-modulating the output of the coordinate rotating circuit 20 and delivering the modulated output to the communication network 6.

The receiver side 2 includes a demodulation circuit 26 for demodulating the coordinates of the received signal point on the complex plane for the signal from the communication network 6, a frame phase detecting circuit 32 for controlling the delay amount T of the variable delay circuit 30 to cause coincidence between the frame phase from the frame phase generating circuit 28 and the received frame phase from the variable delay circuit 30, a coordinate rotating circuit 34 for applying rotation in the reverse direction of that of the coordinate rotation in the transmitter side based on the frame phase information of the frame phase generating circuit 28, a first decision circuit 36 for deciding the nearest signal point among the signal points on the complex plane having the possibility of transmission with respect to the signal receiving point coordinates delivered from the coordinate rotating circuit 34 as the hard decision, a second decision circuit 38 for deciding the maximum likelihood signal point by utilizing the redundancy added by the error control coding means 16 of the transmitter side and correcting the coordinate error of the received signal point, and an unsynchronized frame state deciding circuit 5 for deciding the unsynchronized frame state based on the distance between the decision point by the first and/or the second decision circuits 36, 38 and the modulated received signal point on the complex plane.

The unsynchronized frame state decision circuit 5 decides the unsynchronized frame state based on the difference between the distance between a point decided by the first decision circuit 36 and the demodulated receiving point, and the distance between a point decided by the second decision circuit 38 and the demodulated receiving point.

Concretely, the unsynchronized frame state decision circuit 5 calculates the distance between the decision point of the first decision circuit 36 and the demodulated receiving point as a first decision error El as the hard decision error, calculates the distance between the decision point of the second decision circuit 38 and the demodulated receiving point as a second decision error as the soft decision error E2, and decides the unsynchronized frame state when the mean value of the differences between the first decision error El and the second decision error E2, "El-E2", becomes more than a predetermined threshold value.

Each of the frame phase generating circuits 12 and 32 generates, as shown in FIG. 2, frame phase information for dividing one frame into the first half frame and the latter half frame. The coordinate rotating circuit 20 of the transmitter side causes a predetermined coordinate rotation of the signal point coordinates included in the first half frame, leaving the signal point coordinates included in the latter half frame not rotated. The coordinate rotating circuit 30 of the receiver side causes a predetermined coordinate rotation of the receiving point coordinates included in the first half frame in the reverse direction of that of the transmitter side, leaving the receiving point coordinate included in the latter half frame not rotated.

The relation between coordinate rotation and non-rotation in the first half frame and the latter half frame is not limited to the above described relation, but conversely, the first half frame can be of non-rotation and the latter half frame can be of rotation.

Further, each of the frame phase generating circuits 12 and 32 respectively provided in the transmitter side and the receiver side generates the same frame phase information independently and synchronously.

In the device shown in FIG. 1, reference numeral 1 denotes the transmitter side, 2 denotes the receiver side, and the transmitter side 1 and the receiver side 2 are connected to each other via the communication network 6. The device of FIG. 1 carries out data transmission at a transmission speed of 14400 bps.

In the transmitter side 1, the bit processing circuit 10 receives the transmission data from the appropriate terminal. The bit processing circuit 10 divides the bit sequence of the transmission data into each modulation bit, carries out processing such as scrambling or the like, and delivers the scrambled data. Since the transmission speed of the device of FIG. 1 is 14400 bps, 14400 bps divided by 2400 bps gives 6 bits. That is, the bit processing circuit 10 outputs a bit sequence of 6 bits per modulation "$Q6_n Q5_n Q4_n Q3_n Q2_n Q1_n$".

The bit sequence of 6 bits is supplied from the bit processing circuit 10 to the Trellis coding circuit 16 as the error control coding circuit, and the Trellis coding circuit 16 delivers a bit sequence of 7 bits including one bit of redundancy in accordance with a predetermined rule. In this case, the Trellis coding circuit 16 inputs a lower 2 bits "$Q2_n Q1_n$" of the bit sequence from the bit sequence processing circuit 10 into the coding circuit including a differential coder and a convolution coder, and generates a subset of 3 bits "$Y2_n Y1_n Y0_n$". The 3-bit subset is combined with the upper 4 bits, and the bit sequence of 7 bits "$Q6_n Q5_n Q4_n Q3_n Y2_n Y1_n Y0_n$" is generated.

The output of the Trellis coding circuit 16 is supplied to the data sequence to coordinate transforming circuit 18 through the switching circuit 42. The switching circuit 42 switches the outputs of the Trellis coding circuit 16 and the training signal generating circuit 14. Namely, the switching circuit 42 selects the training signal from the training signal generating circuit 14 prior to the data transmission, and causes the pulling-in of the automatic equalizer of the receiver side 2 by the training signal from the training signal generating circuit 14.

In the device of FIG. 1, the frame synchronization signal is included in the training signal generated in the training signal generating circuit 14. This frame synchronization signal is detected from the training signals in the receiver side, and the frame synchronization control is carried out during a training time. Needless to say, the switching circuit 42 selects the output of the Trellis coding circuit 16 during the data transmission.

The data sequence to coordinate transforming circuit 18 transforms the bit sequence of 7 bits obtained from the Trellis coding circuit 16 to the coordinates representing the signal point on the complex plane. For example, the data sequence to coordinate transforming circuit 18 delivers the coordinate value of the signal point on the complex plane, indicated by a black point in FIG. 3, having a binary number of the bit sequence of 7 bits arranged according to the arrangement of signal points in Trellis coding modulation shown in FIG. 3, i.e., the coordinate data constituted by the real number axis (Re) amplitude and the imaginary number axis (Im) amplitude. In the signal point arrangement shown in FIG. 3, A, B, C, and D are the signal points for low speed in the first half portion of the training signal.

Following the data sequence to coordinate transforming circuit 18, the coordinate rotating circuit 20 is provided for applying a predetermined rotation to the signal point coordinate on the complex plane from the data sequence to coordinate transforming circuit 18 based on the frame phase information from the frame phase generating circuit 12.

The frame phase generating circuit 12 is actuated when the power supply is turned on and independently operated for dividing one frame constituting 8 modulations into the first half frame and the latter half frame, as shown by the transmitter side frame phase information (FIG. 2 (2)).

According to the frame phase information from the frame phase generating circuit 12, the coordinate rotating circuit 20 applies the rotation θ on the complex plane, for example the rotation θ of +90°, i.e., a clockwise rotation of 90° on the complex plane as shown in FIG. 3, to the signal point coordinates from the data sequence to coordinate transforming circuit 18, included in the first half frame A, leaving the lower signal coordinate included in the latter half frame not rotated, and repeats the same operation for each frame.

The output of the coordinate rotating circuit 20 is supplied to the modulation circuit 24, modulated by phase-modulation, quadrature modulation, or the like, and the modulated output is delivered to the communication network. In other words, in the modulation circuit 24, the real number axis (Re) amplitude of the signal point coordinates delivered from the coordinate rotating circuit 20 is modulated by $\sin\omega t$, the imaginary number axis (Im) amplitude of the signal point coordinate is modulated by 90° advanced $\sin\omega t$, and after both components are composed together, the composed data is delivered to the communication network 6.

In the receiver side, reference number 26 indicates a demodulation circuit for demodulating the receiving point coordinates, i.e., the signal point coordinates from the signal received from the communication network 6. In other words, the real number axis (Re) amplitude is decided by detecting the synchronization of the received signal by $\cos\omega t$, and the imaginary number axis (Im) amplitude is decided by detecting the synchronization by $\sin\omega t$. The demodulation circuit 26 includes, of course, a circuit for eliminating the network deterioration factor, such as an automatic equalizer, CAPC, and the like.

Following the modulation circuit 26, the frame phase generating circuit 28, the variable delay circuit 30 and the frame phase detecting circuit 32 are provided for carrying out synchronization control of the frame phase.

The frame phase detecting circuit 32 detects the frame synchronization signal included in the training signal from the transmitter side 1, and adjusts the delay amount T of the variable delay circuit 30 so that the frame phase information from the frame phase generating circuit 28 of the receiver side 2 is coincident with the phase of the frame phase information of the transmitter side of the frame phase generating circuit 12 in the transmitter side.

Both the frame phase generating circuit 12 of the transmitter side and the frame phase generating circuit 28 of the receiver side are independently actuated when the device is powered up for generating the frame phase information of the frame divided into the first half frame and the latter half frame. However, the coincidence between the frame phases of the transmitter side and the receiver side is not established. In the frame phase detecting circuit 32, the frame phase of the transmitter side is decided by the frame synchronization signal detected from the training signals, the error of the frame phase of the receiver side in relation to the frame phase of the transmitter side, i.e., the delay amount r, is obtained, and the delay amount of the variable delay circuit 30 is adjusted accordingly. According to the signal delay by the variable delay circuit 30, the frame phases of the frame phase generating circuits 12 and 28 of the transmitter side and the receiver side may be made coincident with each other.

The coordinate rotating circuit 34 applies rotation in the reverse direction of that of the transmitter side on the complex plane to the receiving point coordinate obtained through the variable delay circuit 30, based on the frame phase information from the frame phase generating circuit 28.

In the device of FIG. 1, in the transmitter side, the coordinate rotating circuit 20 of the transmitter side applies the rotation θ of, for example, +90° for the first half frame, leaving the latter half frame not being rotated. Thus, the coordinate rotating circuit 34 applies the rotation θ i.e., −90°, in the reverse direction of that of the transmitter side, to the receiving point coordinates included in the first half frame based on the frame phase information from the frame phase generating circuit 28, leaving the latter half frame not rotated.

Therefore, the signal point coordinates rotated by the coordinate rotating circuit 34 in the transmitter side returns to the initial signal point coordinates before being rotated in the receiver side, provided that the frame synchronization is properly established.

The receiving point coordinates from the coordinate rotating circuit 34 are delivered to each of the first decision circuit 36 as the hard decision means and the second decision circuit 38 as the soft decision means.

The first decision circuit 36 decides the nearest signal point among the signal points on the complex plane having the possibility of transmission, and delivers the coordinate point closest to the received signal point as the decision point.

The second decision circuit 38 decides the maximum likelihood signal point on the complex plane preliminarily determined by utilizing the redundancy bit according to the Trellis coding performed by the Trellis coding circuit 16 of the transmitter side, and corrects the error of the received signal point. For example, the second decision circuit 38 sets the evaluation value for each of the transition sequence of a plurality of the received signals based on the transition rule in accordance with the Trellis coding in the transmitter side, updates the evaluation value for each receipt of the signals, and selects the transition sequence of the maximum likelihood received signal based on the updated evaluation numeral to correct the error in the demodulated signal point. This operation is referred to as a Viterbi decoding decision. For an explanation of Viterbi decoding decision, refer to, for example, "The Viterbi Algorithm", Proceedings of the IEEE, Vol. 61, No. 3, Pages 268–278, published by I.E.E.E., U.S.A., March 1973.

The signal point decided by the second decision circuit 38 is delivered to the coordinate to data sequence transforming circuit 44, and the coordinate to data sequence transforming circuit 44 is provided with the mapping circuit having binary numbers of the 6-bit data for each of the signal point arrangements. The decision coordinate point is transformed into 6-bit data, and the transformed data is delivered to a bit processing circuit 46. The bit processing circuit 46 carries out descrambling and the like, combines the 6-bit data, and delivers the received data to the terminal.

Further, in the device of FIG. 1, the unsynchronized frame state decision circuit 5 is provided. For the unsynchronized frame state decision circuit 5, the demodulated receiving point from the coordinate rotating circuit 34, the hard decision point from the first decision circuit 36, and the soft decision point from the second decision circuit 38 are delivered.

The unsynchronized frame state decision circuit 5 is constituted by error calculating circuits 50 and 52, difference calculating circuit 54, mean value determining circuit 56, and decision circuit 58.

The error calculating circuit 50 calculates the distance on the complex plane between the demodulated receiving point and the decision point of the first decision circuit 36 to derive a hard decision error El.

The error calculating circuit 52 calculates the distance on the complex plane between the demodulated receiving point and the soft decision point of the second decision circuit 36 to derive a soft decision error E2.

The hard decision error El calculated by the error calculating circuit 50 and the soft decision error E2 calculated by the error calculating circuit 52 are delivered to the difference calculating circuit 54, and the difference between the decision errors "E2 - El" is calculated in the difference calculating circuit 54. The output of the difference calculating circuit 54 is supplied to the mean value determining circuit 56. The mean value determining circuit 56 determines the mean difference value between, for example, several frames. Finally, the decision circuit 58 compares the determined mean value with a predetermined threshold value, and generates an output decision of an unsynchronized frame state when the mean value becomes more than the predetermined threshold value.

Next, the operation of the device of FIG. 1 will be described referring to the signal waveforms shown in FIG. 2.

When the power is switched on in the transmitter side 1 and the receiver side 2, the frame phase generating circuit 12 of the transmitter side 1 and the frame phase detecting circuit 32 of the receiver side 2 are independently actuated, and generate frame phase information indicating the first half frame and the latter half frame independently (FIGS. 2 (2) and 2(6)).

The switch circuit 42 is switched to the training signal 14 side, and the training signal including the frame synchronization Signal is transmitted from the training signal generating circuit 14 to the receiver side 2. The receiver side 2, upon the receipt of the training signal from the transmitter side 1, carries out the network compensation processing including the pulling-in of the automatic equalizer provided in the demodulation circuit 26 and the like, detects the frame synchronization signal included in the training signal by the frame phase detecting circuit 32, and detects the timing of the frame phase of the frame phase generating circuit 12 of the transmitter side 1. Thus, in the frame phase detecting circuit 32, the phase error between the frame phase information of the transmitter side and the frame phase information of the receiver side, i.e., the delay amount T, is detected, and the frame phase detecting circuit 32 adjusts the delay amount of the variable delay circuit 30 to the detected delay amount T. Accordingly, even if the coincidence between the frame phases of the transmitter side and the receiver side is not established, the frame of the received signal obtained through the signal delay of the variable delay circuit 30 becomes coincident with the frame phase information of the frame phase generating circuit 28 by setting the delay amount T Of the variable delay circuit 30 based on the frame synchronization signal.

Upon the completion of transmission of the training signal, the transmitter side 1 starts the transmission of data from the terminal.

In the bit processing circuit 10, the bit sequence of 6 bits per modulation is derived from the transmission data synchronously with the modulation synchronization signal. A single redundancy 1 bit is added to the 6 bit sequence by coding the lower 2 bits in the Trellis coding circuit 16 to transform the 6 bit sequence to a 7 bit sequence. The transformed bit sequence is delivered to the data sequence to coordinate transforming circuit 18 through the switch circuit 42. An example of the signal point arrangement in the Trellis coding modulation is shown in FIG. 3. The data sequence to coordinate transforming circuit 18 transforms the 7 bit sequence to the signal point coordinates by a mapping circuit having a signal point arrangement corresponding to the binary numbers of the 7 bit sequence delivered from the Trellis coding circuit 16, and delivers the transformed data to the coordinate rotating circuit 20.

Frame phase information is supplied from the frame phase generating circuit 12 to the coordinate rotating circuit 20, and the coordinate rotating circuit 20 causes a predetermined coordinate rotation θ, of for example, +90° as θ on the complex plane, of 4 signal point coordinates included in the first half frame of the frame phase information, leaving the 4 signal coordinates included in the latter half frame not rotated, and delivers the signal point coordinates to the modulation circuit 24. Thus, the signal point coordinates successively delivered through the coordinate rotating circuit 20 are modulated in the modulation circuit 24, and the modulated signal point coordinates are delivered to the communication network 6. In this case, the real number axis (Re) coordinate value is modulated by $\cos\omega t$, while the imaginary number axis (Im) coordinate value is modulated by 90° advanced $\sin\omega t$, and the synthetic signal of both components is delivered to the communication network.

In the receiver side 2, the signal point coordinates are demodulated from the received signal from the communication network 6 by the demodulation circuit 26, the variable delay circuit 30 applies the signal delay of delay amount T, which is set while receiving the training signal, to the demodulated signal point coordinates so that the signal point coordinates are synchronized with the frame phase and delivered to the coordinate rotating circuit 34. Based on the phase information from the frame phase generating circuit 28, i.e., the frame phase information (FIG. 2 (6)), the coordinate rotating circuit 34 causes the coordinate rotation θ, for example θ=−90°, in the reverse direction of that of the transmitter side for the receiving point coordinates of the first half frame of one frame, leaving the latter half frame thereof not rotated. Thus, the receiving point delivered from the coordinate rotating circuit 34 returns to the original signal point before being rotated in the transmitter side.

The receiving point coordinates rotated by the coordinate rotating circuit 34 are delivered to the second decision circuit 38. The second decision circuit 38 corrects the error of the demodulated receiving point by deciding the maximum likelihood signal point on the complex plane according to the Viterbi decoding processing, and the coordinate to data sequence transforming circuit 44 transforms the error-corrected received signal point to 6 bit data using the mapping circuit. The bit processing circuit 46 carries out processing such as de-scrambling and the like on the 6 bit data, then after that, combines the 6 bit data of each successive modulation, and transmits the combined data to the appropriate terminal side.

In the unsynchronized frame state decision circuit 5, the error calculating circuits 50 and 52 calculate the hard decision error El and the soft decision error E2 by using the decision point obtained from the first decision circuit 36 and the second decision circuit 38 at each received modulation signal of one modulation. The difference operation circuit 54 finds the difference between the errors, the mean value determining circuit 56 determines the mean value with respect to a predetermined number of frames, and compares the result with a predetermined threshold value which is set in the second decision circuit 58.

One or more modulation signals may be missing due to an instantaneous interruption caused by switching a connection or the like in the communication network 6 during data transmission between the transmitter side 1 and the receiver side 2. In this case, the number of the modulation synchronization signal (FIG. 2 (8)) becomes 7 or less in one frame interval, and the frame phase of the receiver side deviates. When the frame phase of the receiver side deviates, the modulation signal included in the rotated frame of the transmitter side does not correspond to the timing of the frame of reverse rotation in the receiver side, but corresponds to the non-rotated frame, or in the transmitter side, the modulation signal included in the non-rotated frame corresponds to the frame of reverse rotation in the receiver side. Accordingly, even if the coordinate rotating circuit 34 of the receiver side 2 applies the reverse rotation to the transmitter side, the signal point does not return to its initial position. Thus, when the frame phase deviates, the continuity of the demodulated receiving point is destroyed and a significant soft decision error E2 is caused with respect to the decision point of the second decision circuit 38. Since lost frame synchronization cannot be recovered, the mean value of the mean value determining circuit 56 becomes more than the threshold value of the second decision circuit 58. Thus, the decision output of an unsynchronized frame state can be obtained.

If the decision output of the unsynchronized frame state decision circuit 5 is obtained, the system is in a state in which data transmission is impossible. In that case, the normal data transmission can be restored by restarting both the transmitter side and the receiver side, and commencing again the transmission of the training signal.

Further, in the unsynchronized frame state decision circuit 5, the unsynchronized frame state is decided based on the mean value of the hard decision error El and the soft decision error E2, and accordingly the unsynchronized frame state can be exactly decided by eliminating the error caused by the characteristics of the communication network. In other words, both the hard decision error El and the soft decision error E2 significantly change according to the characteristics of the network, and if the network characteristics are stable, the unsynchronized frame state can be decided only by detecting an increase in the soft decision errors due to the unsynchronized frame state.

In the device of FIG. 1, the rotation and reverse rotation are carried out only for the first half frame of the frame phase information of the transmitter side. Another way, i.e., non-rotation of the first half frame and rotation and reverse rotation of the latter half frame, may be used to obtain the same effect.

Also, in the device of FIG. 1, the frame phase information is divided, into the first half frame and the latter half frame, but other frame phase information with frames divided into 3 divisions, 4 divisions, or another appropriately selected division of frame phase information may be used.

Further, the device of FIG. 1 is an example in which the rotation of the signal point coordinates by 90° is carried out on the complex plane, but other rotation angles may be used provided that the rotation angle is appropriately selected so that an adequate soft decision error can be obtained according to the unsynchronized frame state.

The device according to another embodiment of the present invention is shown in FIG. 4. The operation of the device of FIG. 4 is illustrated in FIG. 5.

The device shown in FIG. 4 is technically closely related to the device of FIG. 1, and it is preferable to use the technology of the device of FIG. 1 together with the technology of the device of FIG. 4.

In the device of FIG. 4, the transmitter side 1 and the receiver side 2 are connected through the communication network 6 such as a telephone network and the like. User data to be transmitted by the transmitter side 1 is coded for error control, and is then modulated by phase-modulation or quadrature modulation and delivered to the communication network 6. In the receiver side 2, the received signal from the communication network 6 is demodulated, errors are corrected by the maximum likelihood signal point decoding, and the transmission data (user data) is reproduced.

First, the transmitter side 1 will be described. In the transmitter side 1, a bit processing circuit 300 is provided. The transmission data is supplied from the user transmission terminal to the bit processing circuit 300, the transmission data is processed by bit processing such as scrambling or the like, and is divided into the number of bits to be transmitted for each modulation, and is then delivered. For example, the bit processing circuit 300 outputs a bit sequence of 6 bits per modulation "Q6n Q5n Q4n Q3n Q2n Q1n", where n is an integer indicating the modulation number.

Reference numeral 180 denotes a selector switch as a second delivery signal selector means. The selector switch 180 switches the output of the bit processing circuit 300 and the output of a high speed signal generating circuit 280 to an error control coding circuit (Trellis code circuit) 110. That is, the selector switch 180 delivers the high speed signal from the high speed signal generating circuit 280 for a predetermined time period from the start of coding and decoding at the start stage prior to the transmission of the transmission data, and after that, switches to the output of the transmission data from the bit processing circuit 300.

The Trellis coding circuit 110 as the error control coding means carries out coding according to a transition rule which restricts the transition on the complex plane of the signal points of the transmission signal.

To the Trellis code circuit 110, the bit sequence of 6 bits per modulation "Q6n Q5n Q4n Q3n Q2n Q1n" is supplied from the bit processing circuit 300 via, for example, the selector switch circuit 180. A subset "Y2n Y1n Y0n" including one redundancy bit, is added by coding the lower 2 bits "Q2n Q1n" of the above mentioned bit sequence by using a differential coder and a convolution coder. The 7 bit sequence including this subset and the upper 4 bits "Q6n Q5n Q4n Q3n", i.e., the bit sequence constituted by 6 bits and 1 added redundancy bit is coded as "Q6n Q5n Q4n Q3n Y2n Y1n Y0n", and this coded signal is delivered.

The output of the Trellis code circuit 110 is supplied to the bit sequence to coordinate transforming circuit 340, and this bit sequence to coordinate transforming circuit 340 outputs the signal point coordinate on the phase plane as the complex plane corresponding to the transmission bit sequence.

The signal point coordinate on the complex plane with respect to the input 7 bit sequence from the Trellis code circuit 110 transformed by the bit sequence to coordinate transforming circuit 340 is, for example, as shown in FIG. 3.

The output of the bit sequence to coordinate transforming circuit 340 is supplied to the modulation circuit 140 through the selector switch circuit 160 which is the first delivery signal selector means. The selector switch circuit 160 switches the output of the bit sequence to coordinate transforming circuit 340 and the output of the low speed signal generating circuit 260 which comprise the non-coded signal generating circuit to the modulation circuit 140. At the actuation stage prior to the transmission of the transmission data, the selector switch circuit 160 selects the output of the low speed signal generating circuit 260, delivers the low speed signal to the communication network 6 through the modulation circuit 140 for a predetermined time period, and selects the output of the bit sequence to coordinate transforming circuit 340, i.e., the signal output coded by the Trellis code circuit 110 upon the completion of the delivery of the low speed signal.

The modulation circuit 140 generates the modulation signal corresponding to the coordinate input of the transmission signal point on the complex plane, or more concretely, modulates the real number axis (Re) amplitude in the signal point input coordinate on the complex plane by amplitude modulation by coswt, further modulates the imaginary number axis (Im) amplitude by amplitude modulation by sinwt having a 90° leading phase, combines these components, and delivers these combined data to the communication network 6.

In the receiver side 2, reference numeral 200 indicates a demodulation circuit which demodulates the modulation signal received from the communication network 6, and outputs the coordinates of the received signal point on the complex plane. In other words, the real number axis (Re) amplitude component and the imaginary number axis (Im) amplitude component are reproduced by detecting synchronization of the received modulation signal by respective coswt and sinwt, and the coordinate data of the received signal point is detected.

The demodulated output from the demodulation circuit 200 i.e., the coordinate data of the received signal point, is supplied to the error control signal decoding circuit 220 as the error control decoding means, which corrects the error of the received signal point from the demodulation circuit 200 by selecting the transition sequence of the maximum likelihood received signal utilizing the transition rule of the signal point restricted in the transmitter side, and by delivering the maximum likelihood signal point coordinate on the complex plane according to the selected transition sequence.

The error control signal demodulation circuit 220, having the evaluation value for each of a plurality of the receiving sequences defined by the transition rule of the signal point restricted by the transmitter side, updates the evaluation value at every receipt of the signal, and corrects the error of the received signal point by selecting the signal sequence of the maximum likelihood received signal based on the updated evaluation value.

The coordinate data of the receiving point the error of which is corrected by the maximum likelihood decoding circuit 220 is supplied to the coordinate to bit sequence transforming circuit 360. The coordinate to bit sequence transforming circuit 360 delivers the bit sequence corresponding to the input receiving point coordinates on the complex plane. The device of FIG. 4 is an example of the case in which the bit sequence of 6 bits per modulation is transmitted, thus, the bit sequence "Q6n Q5n Q4n Q3n Q2n QIn" is delivered from the coordinate to bit sequence transforming circuit 360.

The bit sequence delivered from the coordinate to bit sequence transforming circuit 360 is supplied to the bit processing circuit 380 which joins the bit sequences divided per 1 modulation, carries out the bit processing such as the scrambling and the like on each bit sequence, and delivers the receiving data to the terminal of the receiver side.

Further, in the device of FIG. 4, the evaluation value setting circuit 240 is provided against the error control signal decoding circuit 220 provided in the receiver side. The evaluation value setting circuit 240 designates to the error control signal decoding circuit 220 the evaluation value which is updated by the first received high speed signal when the transmission signal from the transmission side 1 is switched from a non-coded low speed signal to the coded high speed signal. For the evaluation value to be designated by the evaluation value setting means 240, the evaluation value which represents the transition sequence of the received signal available for the error control signal decoding circuit 220 when the number of received coded high speed signals delivered from the transmitter side 1 is more than a predetermined number.

The operation of the device of FIG. 4 will be described with reference to FIG. 5.

When the transmitter side 1 receives the transmission request from the terminal side at the time tl, the selector switch circuit 160 switches to the low speed signal generating circuit 260, the low speed signal is supplied from the low speed signal generating circuit 260 to the modulation circuit 140 through the selector switch circuit 160, and the low speed signal modulated by the modulation circuit 140 is delivered to the communication network 6. The receiving signal from the communication network is demodulated by the demodulation circuit 200, and the low speed signal is reproduced. The actuation of the error control signal decoding circuit 220 provided in the receiver side 2, the coordinate to bit sequence transforming circuit 360, the bit processing circuit 380, and other necessary circuit portions, is carried out. When the actuation operation is carried out upon the reception of a low speed signal, the decoding operation by the error control signal decoding circuit 220 is not carried out.

When a predetermined time period from the time tl has elapsed, i.e., when the transmission of the low speed signal of a predetermined number covering successive data is completed, the selector switch circuit 160 cuts off the output of the low speed signal generating circuit 260 and connects the output of the bit sequence to coordinate transforming circuit 340 to the modulation circuit 140. At the same time, the selector switch circuit 180 selects the output of the simultaneously actuated high speed signal generating circuit 280 at a timing of completion of the low speed signal generating circuit 260, and supplies the high speed signal having the bit pattern predetermined for this transmission system.

The high speed signal generating circuit 280 outputs the bit sequence of 6 bits having a predetermined fixed bit pattern, and the bit pattern is either the repetition of the same pattern or the repetitive output of a plurality of bit patterns which change in accordance with a predetermined procedure.

The first coded high speed signal is demodulated by the demodulation circuit 200 in the receiver side 2, and the signal point coordinate data is supplied to the error control signal decoding circuit 220. Then the time period of the low speed signal is measured by a timer (not shown) in the receiver side, and when a predetermined time period has elapsed, the time of receiving the signal point coordinate data is identified. The error control signal decoding circuit 220 updates the evaluation value which is predetermined by the evaluation value setting means 240 based on the received and demodulated signal point coordinate at this time, and, based on the updated evaluation value, the error of the demodulated signal point coordinates is corrected, so that signal point coordinates in accordance with the transition sequence of the received signal are realized.

When the first coded high speed signal is received, a previously coded high speed signal is not available to the error control signal decoding circuit 220, therefore, an evaluation value to be updated does not exist in that circuit 220. However, in the device of FIG. 4, in appearance, the same state as the state in which more than a predetermined number of the high speed signals has been received and the error control signals have been demodulated is established by the evaluation value setting means 240. Therefore, in the device of FIG. 4, the evaluation value of the receiver side is a numeral having continuity from the viewpoint of the transition rule of the transmission signal, and reliable correction of the error can be carried out in the error control signal decoding circuit 220 even immediately after the switching transmission of the decoded high speed signals.

The receiving signal point coordinates the error of which is corrected by the error control signal decoding circuit 220, are transformed into the bit sequence of 6 bits by the coordinate to bit sequence transforming circuit 360, and after that, are transformed to the receiving data in which the bit sequence divided at each modulation by the bit processing circuit 380, and these bit sequences are connected in sequence.

When the transmission of the high speed signals is completed at the time t3 after a predetermined time period from the time t2 has elapsed, the selector switch circuit 180 of the transmitter side 1 cuts off the output of the high speed signal generating circuit 280, connects the output of the bit processing circuit 300 to the error control coding circuit 110, carries out the bit processing such as the scrambling and the like on the transmission data, divides the data into 6 bit sequences at each 1 modulation and delivers them to the error control coding circuit 110, and in the same way as the high speed signal, causes coding for controlling errors, and delivers the data to the receiver side 2 so the correct data can always be received in the receiver side 2 due to the error correction by the error control signal decoding circuit 220.

Although the device of FIG. 4 is an example of the device in which the data divided into the bit sequence of 6 bits per modulation is transmitted, the device according to the present invention is not restricted to this example, and the number of bits per 1 modulation may be appropriately selected based on the transmission speed.

We claim:

1. A modulator-demodulator device capable of detecting an unsynchronized frame state, wherein a receiver device is connected to a network in which data to be transmitted is maximum likelihood coded, the coded data is phase modulated, and the phase modulated coded data is transmitted as a modulated signal, said receiver device comprising:

demodulator means for demodulating the modulated signal to produce a received signal point;

compensating means for compensating the received signal point for signal deterioration from rotation of the modulated signal to produce a compensated signal point;

proximate signal point determining means for determining a hard decision signal point by selecting one signal point from a plurality of ideal signal points in a predetermined proximity of the compensated signal point;

maximum likelihood signal point determining means for decoding the maximum likelihood coded data by determining a maximum likelihood signal point using the compensated signal point;

first comparing means for comparing the compensated signal point and the hard decision signal point and deriving a hard error value;

second comparing means for comparing the compensated signal point and the maximum likelihood signal point and deriving a soft error value; and difference means for deriving a difference between the hard error and the soft error to output an unsynchronized frame state indication based on the difference.

2. A receiver device connected to a network in which data is transmitted as a modulated signal, comprising:

demodulator means for demodulating the modulated signal to produce a received signal point;

proximate signal point determining means for determining a hard decision signal point by selecting one signal point from a plurality of ideal signal points in a predetermined proximity of the received signal point;

first comparing means for comparing the received signal point and the hard decision signal point and deriving a hard error value maximum likelihood signal point determining means for decoding maximum likelihood coded data by determining a maximum likelihood signal point using the received signal point; and second comparing means for comparing the received signal point and the maximum likelihood signal point and deriving a soft error value.

3. A device as defined in claim 2, further comprising:

difference means for deriving a difference between the hard error value and the soft error value to output an unsynchronized frame state indication based on the difference.

4. A receiver device connected to a network in which data is transmitted as a modulated signal, comprising:

a demodulator to demodulate the modulated signal to produce a received signal point;

a first decision circuit coupled to said demodulator to determine a hard decision signal point by selecting one signal point from a plurality of ideal signal points in a predetermined proximity to the received signal point;

a first error calculation circuit coupled to said demodulator and said first decision circuit to calculate a hard error value based on the received signal point and the hard decision signal point;

a second decision circuit coupled to said demodulator to decode maximum likelihood coded data by determining a maximum likelihood signal point using the received signal point; and a second error calculation circuit coupled to said demodulator and said second decision circuit to calculate a soft error value based on the received signal point and the maximum likelihood signal point.

5. A device as defined in claim 4, further comprising:

a difference operation circuit coupled to said first and second error calculation circuits to obtain a difference between the hard error value and the soft error value and to output an unsynchronized frame state indication based on the difference.

6. A method of receiving a modulated signal in a receiver device connected to a network in which data is transmitted as a modulated signal, comprising:

a) automatically demodulating the modulated signal to produce a received signal point;

b) automatically determining a hard decision point by selecting one signal point from a plurality of ideal signal points in a predetermined proximity to the received signal point;

c) automatically calculating a hard error value based on the received signal point and the hard decision signal point;

d) automatically decoding maximum likelihood coded data by determining a maximum likelihood signal point using the received signal point; and e) automatically calculating a soft error value based on the received signal point and the maximum likelihood signal point.

7. A method as defined in claim 6, further comprising:

f) automatically obtaining a difference between the hard error value and the soft error value and outputting an unsynchronized frame state indication based on the difference.

* * * * *

UNITED STATES PATENT AND TRADEMARK OFFICE
CERTIFICATE OF CORRECTION

PATENT NO. : 5,572,537     Page 1 of 3

DATED : November 5, 1996

INVENTOR(S) : Mizutani et al

It is certified that error appears in the above-indentified patent and that said Letters Patent is hereby corrected as shown below:

On the Cover
  Section [56], insert --U.S. Patent No. 4,837,766 6/89 Yoshida--.

Column 3
  Line 11, change "modulatordemodulator" to --modulator-demodulator--, Line 39, change "modulatordemodulator" to --modulator-demodulator--.

Column 5
  Line 12, change "T" to --$\tau$--.

Column 6
  Lines 20 and 27, change "Qln" to --Q1n--;
  Lines 30 and 32, change "Yln" to --Y1n--.

Column 7
  Line 47, change "T" to --$\tau$--;
  Line 65, change "r," to --$\tau$,--.

UNITED STATES PATENT AND TRADEMARK OFFICE
CERTIFICATE OF CORRECTION

PATENT NO. : 5,572,537

DATED : November 5, 1996

INVENTOR(S) : Mizutani et al

It is certified that error appears in the above-indentified patent and that said Letters Patent is hereby corrected as shown below:

Column 9
    Lines 11, 16 and 20, change "El" to --E1--;
    Line 41, change "Signal" to --signal--;
    Lines 54 and 57, change "T" to --$\tau$--;
    Line 63, change "T Of" to --$\tau$ of--.

Column 10
    Line 36, change "T," to --$\tau$,--.

Column 12
    Lines 27, 45 and 49, change "Qln" to --Q1n--;
    Lines 47 and 54, change "Yln" to --Y1n--.

Column 13
    Line 63, change "Qln" to --Q1n--.

Column 16
    Claim 2, Line 27, after "value" insert --;-- (semicolon).

UNITED STATES PATENT AND TRADEMARK OFFICE
CERTIFICATE OF CORRECTION

PATENT NO. : 5,572,537
DATED : November 5, 1996
INVENTOR(S) : Mizutani et al

It is certified that error appears in the above-indentified patent and that said Letters Patent is hereby corrected as shown below:

Column 6, lines 30 and 32, change "Y0n" to --Y0n--.

Signed and Sealed this

Fifth Day of August, 1997

Attest:

BRUCE LEHMAN

Attesting Officer    Commissioner of Patents and Trademarks